(12) United States Patent
Tasaki et al.

(10) Patent No.: US 8,139,579 B2
(45) Date of Patent: *Mar. 20, 2012

(54) UNICAST/MULTICAST SYSTEM

(75) Inventors: Yuuichi Tasaki, Tokyo (JP); Kazuhiko Isoyama, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 425 days.

This patent is subject to a terminal disclaimer.

(21) Appl. No.: 12/058,311

(22) Filed: Mar. 28, 2008

(65) Prior Publication Data

US 2008/0317029 A1 Dec. 25, 2008

Related U.S. Application Data

(60) Continuation of application No. 11/009,003, filed on Dec. 13, 2004, now Pat. No. 7,369,553, which is a division of application No. 09/676,559, filed on Oct. 2, 2000, now Pat. No. 6,895,006.

(30) Foreign Application Priority Data

Oct. 1, 1999 (JP) ..................................... 11-281549

(51) Int. Cl.
H04L 12/28 (2006.01)

(52) U.S. Cl. ...................................................... 370/390

(58) Field of Classification Search .................. 370/390, 370/292, 395.31, 270, 351, 389, 395.1, 398, 370/395.2, 395.3, 395.32, 412, 417, 418, 370/428, 429

See application file for complete search history.

(56) References Cited

U.S. PATENT DOCUMENTS

| 5,267,235 | A |   | 11/1993 | Thacker |
| 5,689,505 | A |   | 11/1997 | Chiussi et al. |
| 5,825,767 | A | * | 10/1998 | Mizukoshi et al. ........ 370/395.7 |
| 5,844,887 | A | * | 12/1998 | Oren et al. .................... 370/218 |
| 5,903,564 | A |   | 5/1999 | Ganmukhi et al. |
| 5,999,531 | A |   | 12/1999 | Ferolito et al. |
| 6,115,379 | A |   | 9/2000 | Flanders et al. |
| 6,188,686 | B1 | * | 2/2001 | Smith ............................ 370/388 |
| 6,188,690 | B1 | * | 2/2001 | Holden et al. ................. 370/390 |
| 6,212,182 | B1 |   | 4/2001 | McKeown |
| 6,349,097 | B1 | * | 2/2002 | Smith ............................ 370/390 |
| 6,826,195 | B1 |   | 11/2004 | Nikolich et al. |
| 6,895,006 | B1 | * | 5/2005 | Tasaki et al. .................. 370/390 |
| 7,369,553 | B2 | * | 5/2008 | Tasaki et al. .................. 370/390 |

FOREIGN PATENT DOCUMENTS

| JP | 5-136814 | 6/1993 |
| JP | 5-236011 | 9/1993 |
| JP | 8-251173 | 9/1996 |
| JP | 9-93257 | 4/1997 |
| JP | 9-162879 | 6/1997 |
| JP | 10-190663 | 7/1998 |

OTHER PUBLICATIONS

U.S. Appl. No. 11/009,003, filed Dec. 13, 2004, 23 pages.

* cited by examiner

*Primary Examiner* — Dmitry H Levitan
(74) *Attorney, Agent, or Firm* — Harrity & Harrity, LLP

(57) ABSTRACT

A unicast/multicast system has an internal cell generating section that generates an internal cell to include its output index information based on user data, and an output port conversion table that stores the relation of output index information and output port number for the internal cell in the form of one-to-one for the unicast and one-to-multiple for the multicast.

20 Claims, 6 Drawing Sheets

FIG.5

| KIND OF INDEX INFORMATION | OUTPUT PORT NUMBER |  |
|---|---|---|
| | 15 14 13 12 11 10 09 7 6 5 4 3 2 1 0 | |
| 001$_H$ | 0 0 0 0 0 0 0 0 0 0 0 0 0 0 1 | FOR UNICAST |
| 002$_H$ | 0 0 0 0 0 0 0 0 0 0 0 0 0 1 0 | |
| 003$_H$ | 0 0 0 0 0 0 0 0 0 0 0 0 1 0 0 | |
| 004$_H$ | 0 0 0 0 0 0 0 0 0 0 0 1 0 0 0 | |
| 005$_H$ | 0 0 0 0 0 0 0 0 0 0 1 0 0 0 0 | |
| 006$_H$ | ⋮ | |
| 00F$_H$ | 1 0 0 0 0 0 0 0 0 0 0 0 0 0 0 | |
| 010$_H$ | 0 0 0 0 0 0 0 0 0 0 0 0 0 1 1 | FOR MULTICAST |
| 011$_H$ | 0 0 0 0 0 0 0 0 0 0 0 0 1 0 1 | |
| 012$_H$ | 0 0 0 0 0 0 0 0 0 0 0 1 0 0 1 | |
| ⋮ | ⋮ | |
| FFF$_H$ | | |

UNICAST/MULTICAST SYSTEM

RELATED APPLICATIONS

This application is a continuation of U.S. patent application Ser. No. 11/009,003, filed Dec. 13, 2004, now U.S. Pat. No. 7,369,553, which is divisional of U.S. patent application Ser. No. 09/676,559, filed Oct. 2, 2000 (now U.S. Pat. No. 6,895,006 B1, issued May 17, 2005), which are incorporated herein by reference in their entirety.

FIELD OF THE INVENTION

This invention relates to a system for unicasting or multicasting IP packets, ATM cells etc.

BACKGROUND OF THE INVENTION

As a switch for processing a multicast cell, for example, Japanese patent application laid-open No. 9-162879 (1997) discloses a shared buffer type ATM. This ATM switch has address buffers provided for its output ports, respectively. The multicast is conducted by sequentially transferring the address pointer of a shared buffer where a multicast cell is stored. Also, the ATM switch needs to be provided with a counter for confirmation of the number of broadcast to be decremented every time a multicast cell is output.

However, the ATM switch has problems below.

The first problem is that it is necessary to provide a large amount of the buffer for multicast so as to cope with a case that the ratio of multicast cells in traffic increases.

The second problem is that it may cause the lowering of throughput since the subsequent multicast processing cannot be run before the counter for confirmation of the number of broadcast becomes zero.

SUMMARY OF THE INVENTION

Accordingly, it is an object of the invention to provide a unicast/multicast system that allows a unicast cell and a multicast cell to be processed in the same circuit.

According to the invention, a unicast/multicast system, comprises:

an internal cell generating section that generates an internal cell based on user data;

an internal cell receiving section that outputs the internal cell to a timing generating section and outputs a header field of the internal cell to an index search section;

an output port conversion table that stores the relation of output index information and output port number in the form of one-to-one for the unicast and one-to-multiple for the multicast;

the index search section that extracts output index information from the header field to be sent from the internal cell receiving section, refers to the output port conversion table for an output port number corresponding to the output index information extracted, and outputs the output port number obtained from the output port conversion table to a destination-based distribution section;

the destination-based distribution sections that controls a gate section based on the output port number input from the index search section;

a timing generating section that delays the internal cell input from the internal cell receiving section and then outputs it the gate section;

the gate section that distributes the internal cell input from the timing generating section to the gate section according to the control of the destination-based distribution section;

a plurality of buffers that each store the internal cell distributed from the gate section and, when receiving the internal cell distributed from the gate section, sends switching request signal to a switching request adjusting section;

the switching request adjusting section that adjusts the switching request signal input from the buffers between the buffers and determines a route in a crosspoint switch; and the crosspoint switch that outputs the internal cell stored in the buffers through the route determined by the switching request adjusting section.

According to another aspect of the invention,

BRIEF DESCRIPTION OF THE DRAWINGS

The invention will be explained in more detail in conjunction with the appended drawings, wherein:

FIG. 5 is a table showing the content of a memory 13B in FIG. 4;

DESCRIPTION OF THE PREFERRED EMBODIMENTS

Figure 1:
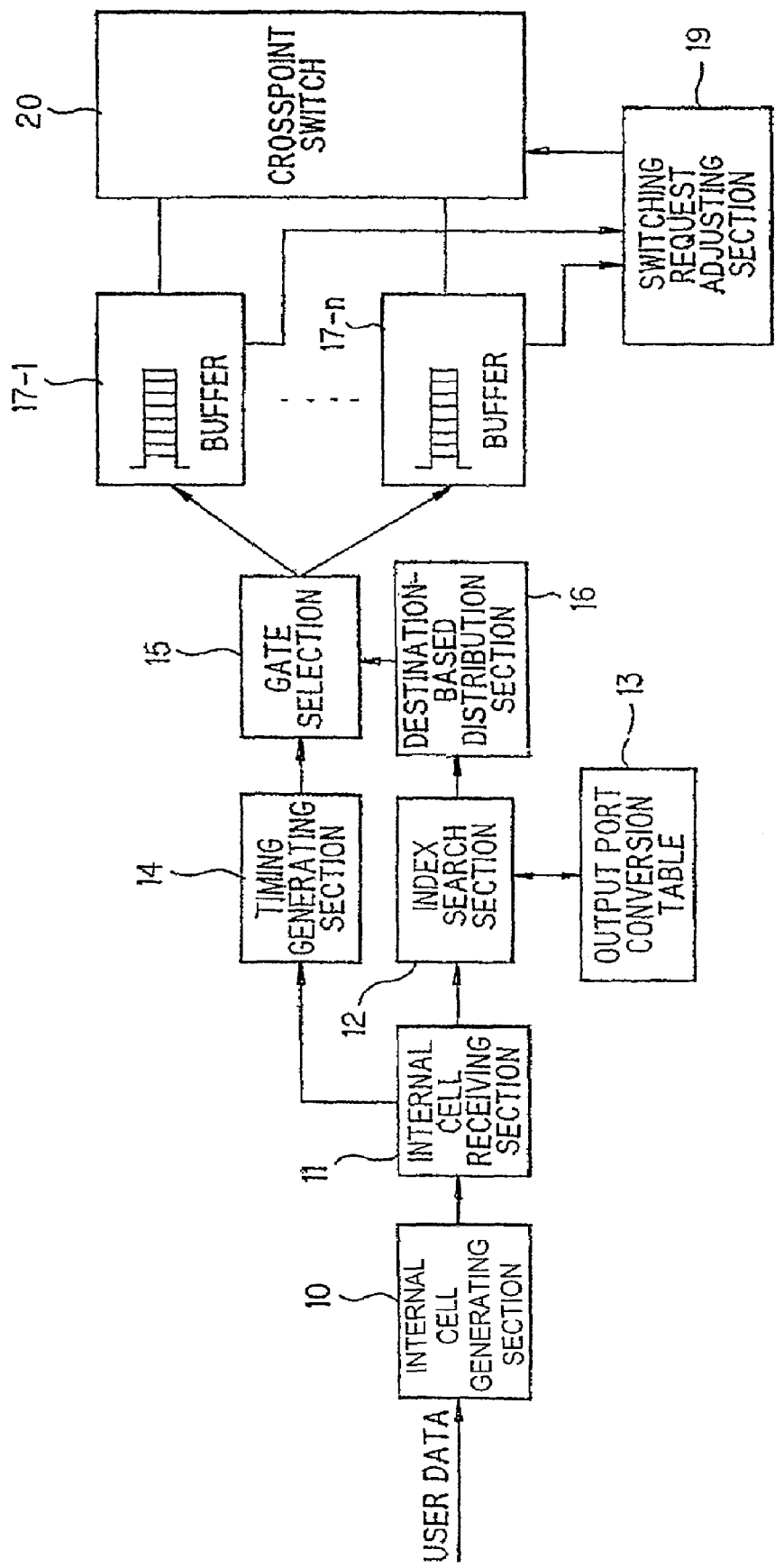
FIG. 1 is a block diagram showing the schematic composition of a unicast/multicast system in a preferred embodiment according to the invention.

The preferred embodiments of the invention will be explained below, referring to the drawings.

FIG. 1 is a block diagram showing the schematic composition of a unicast/multicast system according to the invention. In FIG. 1, 10 is an internal cell generating section to generate a cell (hereinafter referred to internal cell) with a fixed length and a specific format dedicated to switching, based on user data such as IP packet (Internet protocol), ATM (asynchronous transfer mode) cell etc. 11 is an internal cell receiving section that has a function to extract a header field from the internal cell. 12 is an index search section to get output port information corresponding to output index information included in the header field by referring to an output port conversion table 13. 13 is the table to store multiple index information and multiple output port number information in the form of one-to-one for the unicast and one-to-multiple for the multicast. 14 is a timing generating section to make the output of internal cell delay a predetermined time. 15 is a gate section that functions as a route to buffers 17-1 to 17-n to store the internal cell. 16 is a destination-based distribution section that controls the gate section 15 according to the output port information. 17-1 to 17-n are the FIFO (first-in first-out) type buffers that are provided for output ports, respectively, and store the internal cell for corresponding one of the output ports. Optionally, the buffers 17-1 to 17-n may be divided into buffers for the unicast and buffers for the multicast. 19 is a switching request adjusting section that controls a crosspoint switch 20 according to a switching request from the buffers 17-1 to 17-n.

Figure 2:
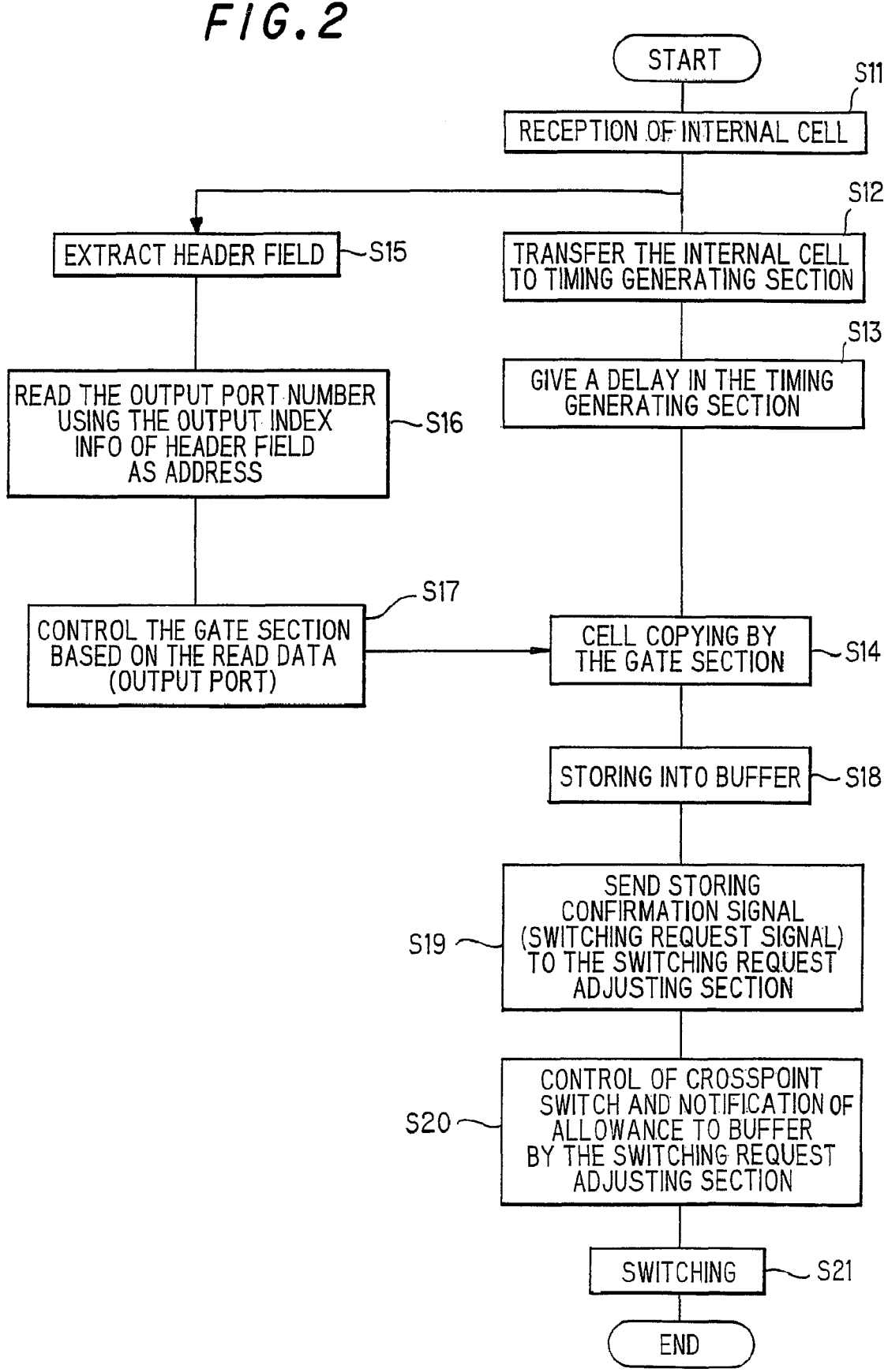
FIG. 2 is a flow chart showing the operation of the unicast/multicast system in FIG. 1.
Figure 3:
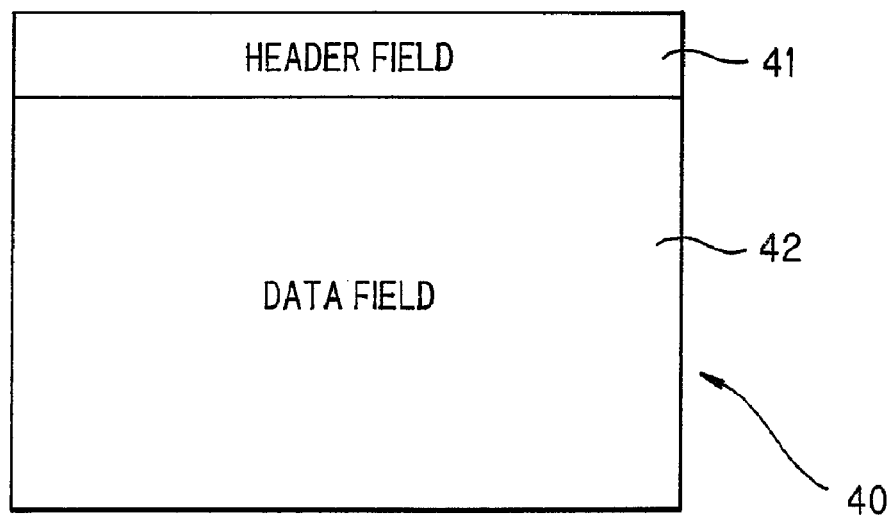
FIG. 3 is a format diagram showing an internal cell used in the unicast/multicast system in the embodiment of the invention.

Referring to FIGS. 1, 2 and 3, the operation of the unicast/multicast system explained above will be explained below.

The internal cell generating section 10 converts global user data such as IP packet and ATM cell into internal cell. As shown by a format diagram in FIG. 3, an internal cell 40 is composed of a header field 41 and a data field 42. The header field 41 stores destination information such as VPI/VCI (virtual path identifier/virtual channel identifier) etc. that is converted into particular and simple form so that the internal cell is correctly subject to the switching inside the unit. The data field 42 stores the original user data. The internal cell receiving section 11 receives the internal cell 40 (step S11). Then, the internal cell receiving section 11 sends the header field 41 of the received internal cell 40 to the index search section 12, and sends the entire internal cell 40 to the timing generating section 14 (step S12). The index search section 12 extracts output index information from the header information of the header field 41 (step S15). After extracting the output index information of the header field 41, the index search section 12 gets output port number by referring to the output port conversion table 13 (step S16). The index search section 12 sends the obtained output port number to the destination-based distribution section 16. The destination-based distribution section 16 controls the gate section 15 according to the output port number received from the index search section 12 (step S17). In this case, when only one output port number is obtained, the gate to one output port opens, and when multiple output port numbers are obtained, the gates to multiple output ports open. On the other hand, the timing generating section 14 makes the internal cell sent to the timing generating section 14 delay the predetermined time that is necessary for the index search section 12 to search the output port number and for the destination-based distribution section 16 to control the gate section 15 (step S13). After the route of gate section 15 is determined, the internal cell is stored, through the gate section 15, into a specific buffer 17-i ($1 \leq i \leq n$) corresponding to the output port in case of the unicast, and into multiple buffers 17-i$_1$, . . . , 17-i$_m$ ($i_1 \geq 1$ and $i_m \leq n$) in case of the multicast (step S14, S18). After the internal cell is stored in the buffer 17-i or buffers 17-i$_1$, . . . , 17-i$_m$, the buffer 17-i or buffers 17-i$_1$, . . . , 17-i$_m$ sends the switching request to the switching request adjusting section 19 (step S19). The switching request adjusting section 19 conducts fairly the adjustment to the switching request received from the multiple buffers 17-1 to 17-n in a unit time, and determines the route of the crosspoint switch 20 (step S20). The crosspoint switch 20 establishes the route to pass the internal cell based on the route information from the switching request adjusting section 19, and conducts the switching of the internal cell (step S21)

First Embodiment

Figure 4:
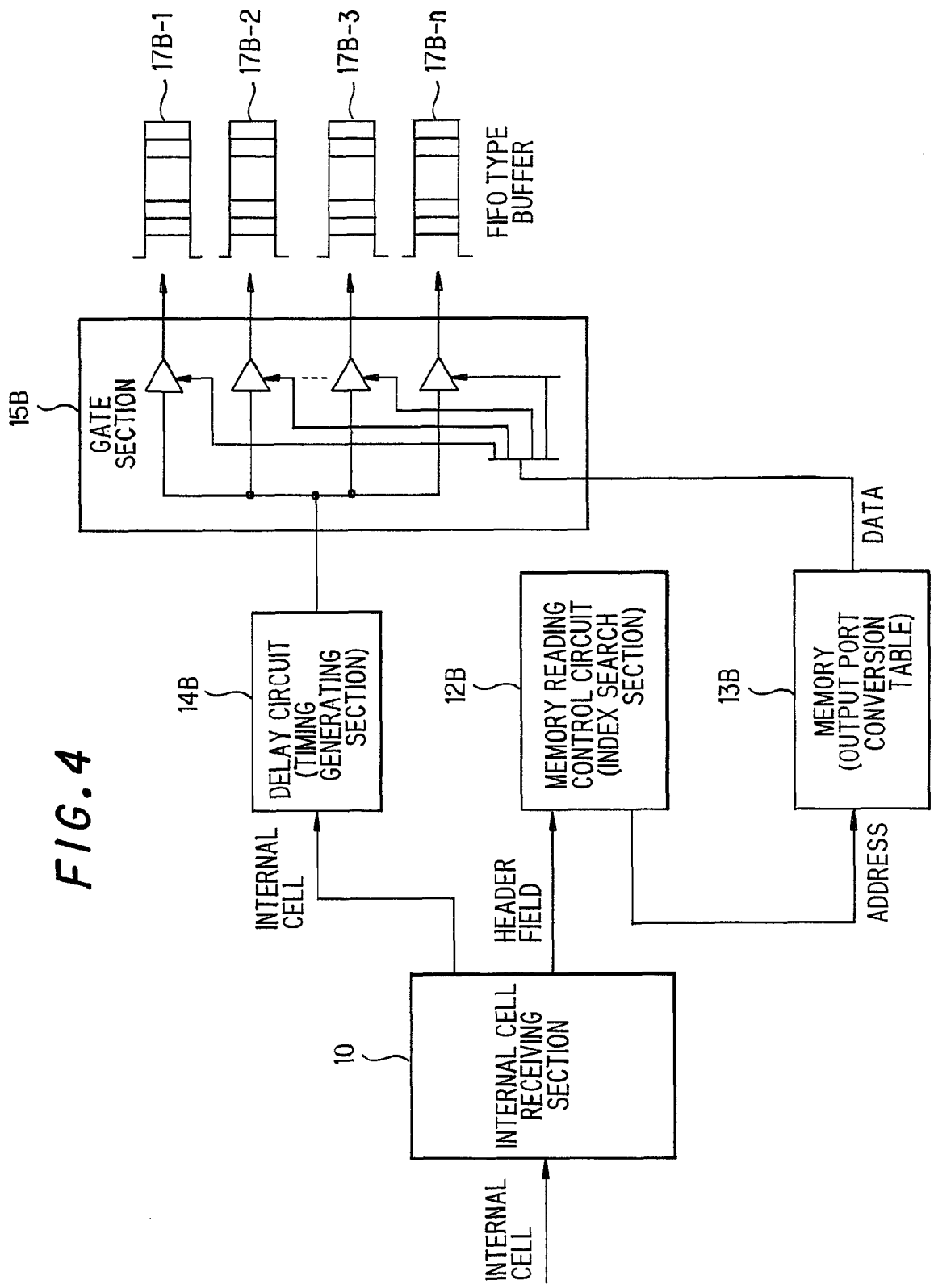
FIG. 4 is a block diagram showing the composition of a unicast/multicast system in a first preferred embodiment according to the invention.

A unicast/multicast system in the first preferred embodiment according to the invention will be explained below, referring to FIGS. 4 and 5.

In this embodiment, as the output port conversion table 13, a memory 13B such as RAM (random access memory) or ROM (read-only memory) is used. In this case, the output index information to be extracted by a memory reading control circuit 12B to function as the index search section 12 corresponds to an address of the memory 13B, and the output port number corresponds to data to be written in each address of the memory 13B. Also, the memory 13B also functions as the destination-based distribution section 16. The output port number is stored in the form of bit pattern so as to facilitate the control of the gate section 15B. In case of the bit pattern form, the number n of ports corresponds to the data width of the memory 13B. Therefore, when a complete unicast region is, in advance, made using a memory of wide data width, it can cope with even such a case that the number n of ports increases, by adding bit pattern information for the multicast to the memory 13B.

FIG. 5 shows an example of the content of the memory 13B in a case that there are 4095 ($=2^{12}-1$) types of output index information and there are 16 output ports. According to need, the output index information can be expanded to 65535 ($=2^{16}-1$) types. The address range of 000H to 00FH is used for the unicast, and the address range of 010H to FFFH is used for the multicast. In this way, bit patterns of "1" for only one bit are used for the unicast, and bit patterns of "1" for multiple bits are used for the multicast. Therefore, by using the composition and operation for the multicast, the unicast can be also handled.

When the memory reading control circuit 12B receives a header field from the internal cell receiving section 10, it extracts the output index information from the header field and then conducts the read operation to the memory 13B using the extracted output index information as address. In reply to this, the memory 13B outputs, as output port number, data corresponding to the output index information (=memory address). The gate section 15B allows a buffer corresponding to a bit with "1" of the data output from the memory 13B to be enabled.

On the other hand, an internal cell sent to a delay circuit 14B is delayed in the delay circuit 14B during the processing time required to determine the route of the gate section 15B. After the internal route of the gate section 15B is determined, the internal cell is output from the delay circuit 14, passing through the enabled buffer of the gate section 15B, written into only a FIFO type buffer corresponding to the enabled buffer. In case of the multicast, they are written into multiple FIFO buffers of the FIFO buffers 17-1 to 17-n, and in case of the unicast, it is written into one FIFO buffer of the FIFO buffers 17-1 to 17-n.

Second Embodiment

In the second preferred embodiment of the invention, even in a case that a multicast cell is desired to be subject to the priority switching, it is nor necessary to provide separate circuits for the unicast and multicast in an existing circuit composition.

Figure 7:
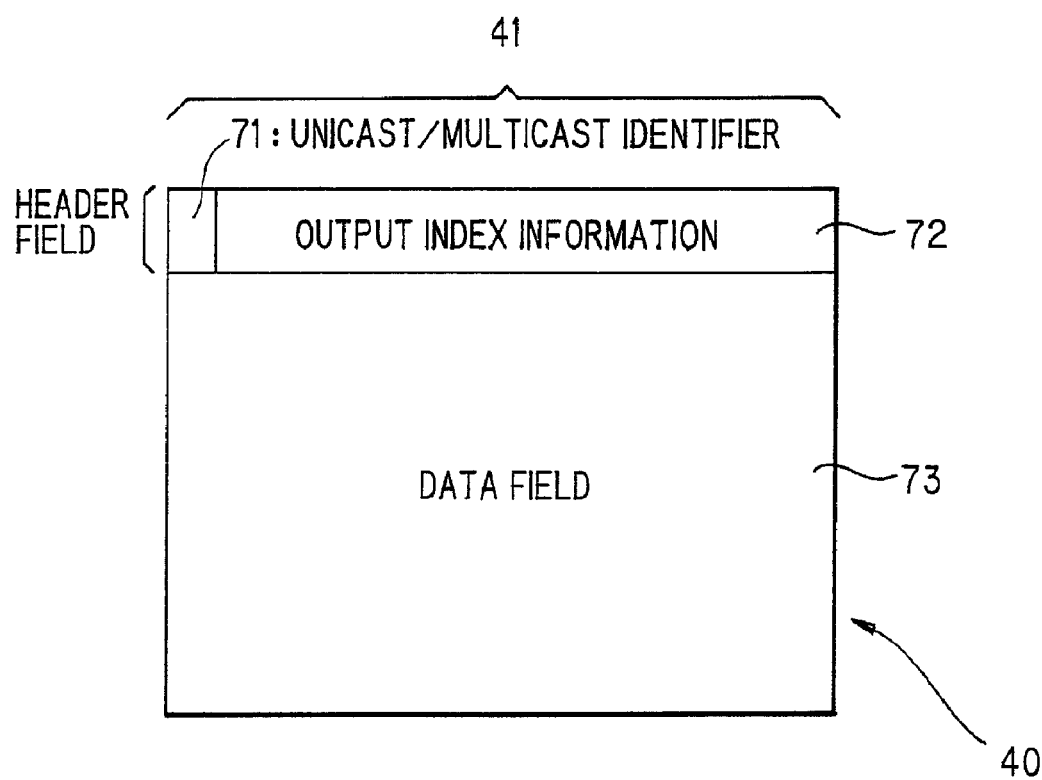
FIG. 7 is a format diagram showing an internal cell used in the unicast/multicast system in FIG. 6.
Figure 6:
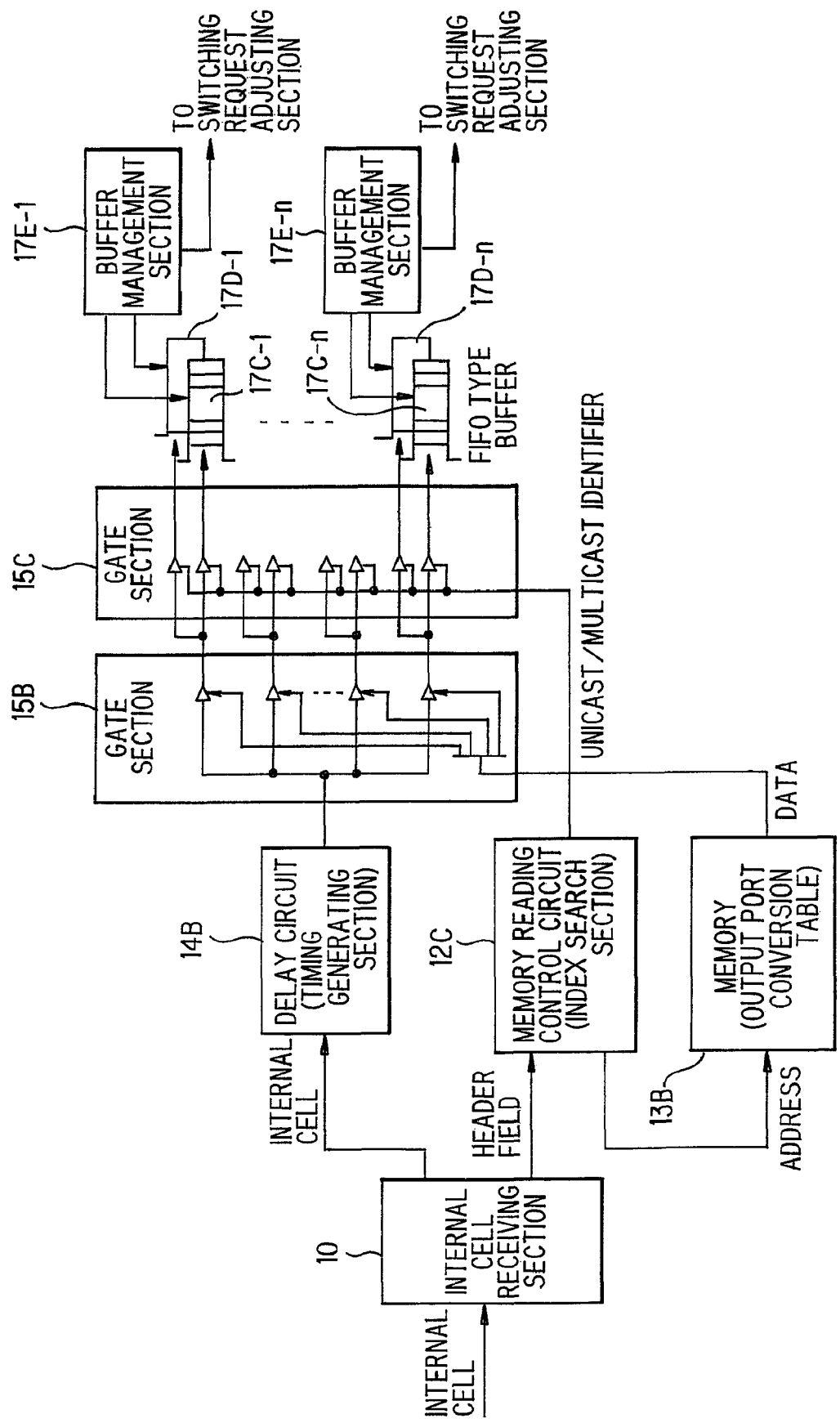
FIG. 6 is a block diagram showing the composition of a unicast/multicast system in a second preferred embodiment according to the invention.

Referring to FIGS. 6 and 7, the second embodiment will be explained below.

FIFO buffers 17C-1 to 17C-n are provided for output ports, respectively, and FIFO buffers 17D-1 to 17D-n are provided for output ports, respectively. The FIFO buffers 17C-1 to 17C-n are provided for the unicast, and the FIFO buffers 17D-1 to 17D-n are provided for the multicast. Also, a FIFO buffer 17C-i and a FIFO buffer 17D-i are provided for an i-th output port. The gate section 15B is the same as that in the first embodiment. A gate section 15C in the second embodiment is an additional gate, and allows an internal cell passed through the gate section 15B to be alternatively supplied to either FIFO 17C-i for the unicast or FIFO 17D-i for the multicast. The internal cell receiving section 10, memory 13B and delay circuit 14 are the same as those in the first embodiment.

FIG. 7 shows the format of internal cell used in the second embodiment. In FIG. 7, an internal cell 40 used in the second embodiment is provided with a unicast/multicast identifier 71 and output index information 72 in header field 41. Similarly to the first embodiment, global user data such as IP packet and ATM cell are stored in data field 73.

When the internal cell receiving section 10 receives an internal cell, it extracts the header field of the internal cell and sends it to the memory reading control circuit 12C. Then, the memory reading control circuit 12C outputs the unicast/multicast identifier 71 of the header field to the gate section 15C, and outputs the output index information 72 thereof to the memory 13B. The memory 13B outputs, similarly to the first embodiment, a bit pattern corresponding to the output index information. The gate section 15B allows, similarly to the first embodiment, a buffer corresponding to a bit with "1" of the output bit pattern to be enabled. The gate section 15C allows a buffer corresponding to a FIFO buffer 17C-i for the unicast or a FIFO buffer 17D-i for the multicast to be enabled, according to the value of the unicast/multicast identifier 71. On the other hand, like the first embodiment, the internal cell sent from the internal cell receiving section 10 to the delay circuit 14B is delayed in the delay circuit 14B during a predetermined time, then passed through the enabled buffer of the gate section 15B. Then, if the unicast is designated by the unicast/multicast identifier 71, the internal cell passed through the enabled buffer of the gate section 15B is passed through a buffer of the gate section 15C corresponding to a FIFO buffer 17C-i for the unicast and written into the FIFO buffer 17C-i for the unicast. If the multicast is designated by the unicast/multicast identifier 71, the internal cell is passed through buffers of the gate section 15C corresponding to FIFO buffers 17D-i for the multicast and written into the FIFO buffers 17D-i for the multicast. Buffer management sections 17E-1 to 17E-n monitor the existence of internal cell stored in the FIFO buffers 17C-1 to 17C-n and 17D-1 to 17D-n. When it detects that the internal cell is stored in any of the FIFO buffers, it sends the switching request to the switching request adjusting section 19. When the transfer allowance to the crosspoint switch is issued from the switching request adjusting section 19, if there is stored a multicast cell, the buffer management sections 17E-1 to 17E-n transfers, by priority, the multicast cell to the crosspoint switch.

ADVANTAGES OF THE INVENTION

First, since a unicast cell is similarly handled in the particular form of multicast cell, separate circuits for unicast cell and multicast cell is not necessary. Therefore, the processing circuit can be simplified.

Second, although the conventional system needs to be provided with separate buffers for the storing inside the system since the unicast cell and multicast cell are processed therein separately, in this invention the buffers for the multicast are not needed since the multicast cell is processed like the unicast cell.

Third, even when it is used with a crosspoint switch having no multicast function (=being not able to connect simultaneously to multiple routes), the multicast can be achieved.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed:
1. A method for processing unicast and multicast data, the method comprising:
  receiving user data;
  generating cell information based on the user data;
  extracting data from the generated cell information, the extracted data including output index information extracted from a header included in the generated cell information;
  identifying at least one output port number based on the output index information, where the identifying at least one output port comprises:
    searching a memory storing output port number information corresponding to output index information,
    identifying, for cell information that is to be unicast, a single output port number from the memory, and
    identifying, for cell information that is to be multicast, a plurality of output port numbers from the memory;
  controlling access to at least one buffer based on the at least one output port number;
  storing the generated cell information in the at least one buffer based on the identified at least one output port number; and
  forwarding the generated cell information from the at least one buffer in response to a switching signal.
2. The method of claim 1, further comprising:
  delaying the forwarding of the cell information to the at least one buffer while the memory is being searched.
3. The method of claim 1, further comprising:
  allowing access to a first buffer corresponding to the single output port number when the cell information is to be unicast, and
  allowing access to a plurality of buffers corresponding to the plurality of output port numbers when the cell information is to be multicast.
4. The method of claim 3, further comprising:
  storing the cell information in the first buffer when the cell information is to be unicast, and
  storing the cell information in each of the plurality of buffers when the cell information is to be multicast.
5. The method of claim 1, further comprising:
  delaying the forwarding of the cell information to the at least one buffer while the identifying at least one output port number is being performed.
6. The method of claim 5, where the delaying comprises:
  delaying the forwarding of the cell information for a period of time.
7. The method of claim 1, where the identifying at least one output port number comprises:
  searching a memory comprising a plurality of bit patterns corresponding to a plurality of output indices, and
  identifying a bit pattern based on the output index information.
8. The method of claim 1, further comprising:
  forwarding a switching request signal after the generated cell information is stored; and
  determining a route through a switch via which to forward the generated cell information.
9. The method of claim 8, further comprising:
  forwarding the generated cell information to a destination.
10. A device for processing unicast and multicast cell information, the device comprising:
  a cell generator to receive user data and generate cell information;
  a non-transitory memory to store a plurality of output port bit patterns, at least some of the plurality of output port bit patterns identifying a plurality of output port numbers for cell information that is to be multicast;
  a search element to:
    extract data from a header field included within the generated cell information, search the memory to identify, for cell information that is to be unicast, an output port bit pattern that identifies a single output port number, based on the extracted data, and search the memory to identify, for cell information that is to be multicast, an output port bit pattern that identifies a plurality of output port numbers, based on the extracted data;

a plurality of buffers to store the generated cell information;

a gating device to control access to the plurality of buffers;

a control device to forward control information, based on the identified output port bit pattern, to the gating device, where the gating device allows the generated cell information to be stored in at least one of the plurality of buffers; and a switching element to:
receive the generated cell information from the at least one of the plurality of buffers, and
forward the generated cell information from the device.

11. The device of claim 10, where, when extracting data, the search element is to identify an output index, and when identifying an output port bit pattern, the search element is to identify the output port bit pattern corresponding to the output index.

12. The device of claim 10, where the gating device is to allow access to each of a plurality of buffers identified by the output port bit pattern.

13. The device of claim 10, further comprising:
a timing element to temporarily store the cell information while the search element is searching the memory.

14. The device of claim 13, where the timing element is to store the cell information for a predetermined period of time.

15. A device, comprising:
one or more processors interconnected with output ports:
store a plurality of output indices and associated output port information;
receive user data, generate, based on the user data, cell information;
delay the forwarding of the cell information;
extract an output index from the cell information;
identify at least one output port number based on the output index;
control a gating element based on the identified at least one output port number, the gating element controlling the forwarding of the cell information to at least one of a plurality of buffers;
forward the cell information to the at least one of the plurality of buffers based on the identified at least one output port number; and
forward the cell information from the device.

16. The device of claim 15, where, when forwarding the cell information to the at least one of the plurality of buffers, the one or more processors are to forward the cell information to a plurality of buffers for cell information that is to be multicast.

17. The device of claim 15, where the gating element is to effectively delay the forwarding of the cell information to the at least one output buffer.

18. The device of claim 15, where, when identifying the at least one output port number, the one or more processors are to:
search a memory storing output port number information corresponding to output index information,
identify, for cell information that is to be unicast, a single output port number from the memory, and
identify, for cell information that is to be multicast, a plurality of output port numbers from the memory.

19. The device of claim 15, where, when identifying the at least one output port number, the one or more processors are further to:
search a memory comprising a plurality of bit patterns corresponding to a plurality of output indices, and
identify a bit pattern based on the output index information.

20. The device of claim 15, where, when identifying the output port number, the one or more processors are to:
identify an output port bit pattern corresponding to the output index.

* * * * *